United States Patent
Schäfer

(10) Patent No.: US 8,061,506 B2
(45) Date of Patent: Nov. 22, 2011

(54) MATERIAL-FLOW CONTROL FOR COLLISION AVOIDANCE IN A CONVEYOR SYSTEM

(75) Inventor: Gerhard Schäfer, Neunkirchen (DE)

(73) Assignee: SSI Schäfer Peem GmbH, Graz (AT)

( * ) Notice: Subject to any disclaimer, the term of this patent is extended or adjusted under 35 U.S.C. 154(b) by 0 days.

(21) Appl. No.: 12/642,748

(22) Filed: Dec. 18, 2009

(65) Prior Publication Data

US 2010/0155194 A1    Jun. 24, 2010

Related U.S. Application Data

(63) Continuation of application No. PCT/EP2008/006727, filed on Aug. 15, 2008.

(30) Foreign Application Priority Data

Aug. 17, 2007  (DE) .................. 10 2007 040 367

(51) Int. Cl.
B65G 47/00    (2006.01)
(52) U.S. Cl. ......... 198/444; 198/448; 198/575; 198/577
(58) Field of Classification Search .............. 198/460.1, 198/461.1, 357, 575, 577, 572, 579, 444, 198/447, 448

See application file for complete search history.

(56) References Cited

U.S. PATENT DOCUMENTS

| | | | | |
|---|---|---|---|---|
| 3,485,339 A | * | 12/1969 | Miller et al. | 198/460.1 |
| 3,944,049 A | * | 3/1976 | Graybill | 198/461.1 |
| 4,044,897 A | * | 8/1977 | Maxted | 198/349 |
| 4,240,538 A | * | 12/1980 | Hawkes et al. | 198/358 |
| 4,360,098 A | * | 11/1982 | Nordstrom | 198/418.1 |
| 4,518,075 A | * | 5/1985 | Aykut et al. | 198/460.1 |

(Continued)

FOREIGN PATENT DOCUMENTS

EP    0 577 021 A    1/1994

(Continued)

*Primary Examiner* — Joseph A Dillon, Jr.
(74) *Attorney, Agent, or Firm* — Kevin J. McNeely; McNeely, Hare & War LLP

(57) ABSTRACT

The present invention relates to a conveyor system and a method for merging or crossing of at least two conveyor lines (22, 24, 58) on which transport units (48, 50), particularly containers, are conveyed in an upstream direction (28), wherein the conveyor lines (22, 24) meet each other in an intersection point (26), wherein each of the conveyor lines (22, 24, 58) respectively comprises, upstream relative to the intersection point (26), one group (30, 34) of conveyor-line segments (32, 34), wherein the conveyor-line segments are respectively operable with a variable conveying velocity, the method comprising the following steps: conveying transport units (48, 50) towards the intersection point (26); detecting and determining a traffic density of the transport units (48, 50) on the conveyor lines (22, 24, 58), particularly at the conveyor-line segments (32-1, 34-1) which are located upstream; determining conveying velocities for the conveyor-line segments (32, 34) so that transport units (48, 50) which are conveyed on one of the conveyor lines (22, 24) do not collide at the intersection point (26) with other transport units (48, 50) which are conveyed on the other conveyor lines (24, 22), and without the need to stop the transport units (48, 50) in a region of the conveyor-line segments (32, 34); adapting the conveying velocities of the conveyor-line segments (32, 34) to the conveying velocities determined in this way, wherein the conveyor-line segments (32, 34) respectively can be operated at a different conveying velocity.

14 Claims, 5 Drawing Sheets

U.S. PATENT DOCUMENTS

| | | | |
|---|---|---|---|
| 4,604,704 A * | 8/1986 | Eaves et al. | 700/230 |
| 4,640,408 A * | 2/1987 | Eaves | 198/460.1 |
| 4,915,209 A * | 4/1990 | Canziani | 198/357 |
| 4,934,510 A * | 6/1990 | Lutgendorf | 198/461.3 |
| 5,038,911 A * | 8/1991 | Doane et al. | 198/357 |
| 5,070,995 A * | 12/1991 | Schaffer et al. | 198/460.1 |
| 5,267,638 A * | 12/1993 | Doane | 198/357 |
| 5,341,915 A * | 8/1994 | Cordia et al. | 198/460.1 |
| 5,341,916 A * | 8/1994 | Doane et al. | 198/460.1 |
| 5,634,551 A * | 6/1997 | Francioni et al. | 198/460.1 |
| 6,435,331 B1 * | 8/2002 | Olson et al. | 198/357 |
| 6,460,683 B1 * | 10/2002 | Pfeiffer | 198/460.1 |
| 6,471,039 B1 * | 10/2002 | Bruun et al. | 198/577 |
| 6,508,350 B1 * | 1/2003 | Ouellette | 198/358 |
| 6,629,018 B2 * | 9/2003 | Mondie et al. | 700/228 |
| 6,729,463 B2 * | 5/2004 | Pfeiffer | 198/460.1 |
| 6,751,524 B2 * | 6/2004 | Neary et al. | 700/230 |
| 6,808,058 B2 | 10/2004 | Shiohara | |
| 7,016,768 B2 * | 3/2006 | Grafer et al. | 700/230 |
| 7,035,714 B2 * | 4/2006 | Anderson et al. | 700/228 |
| 7,191,895 B2 * | 3/2007 | Zeitler et al. | 198/460.1 |
| 7,222,718 B2 * | 5/2007 | Tarlton | 198/445 |
| 7,360,638 B2 * | 4/2008 | Ko et al. | 198/575 |
| 7,542,823 B2 * | 6/2009 | Nagai | 700/230 |
| 7,631,747 B2 * | 12/2009 | Zeitler | 198/460.1 |
| 7,909,155 B2 * | 3/2011 | Lupton et al. | 198/357 |
| 2009/0032370 A1 | 2/2009 | Konig et al. | |

FOREIGN PATENT DOCUMENTS

| | | |
|---|---|---|
| EP | 1 228 986 A1 | 7/2002 |
| WO | 97/09256 A | 9/1996 |

* cited by examiner

MATERIAL-FLOW CONTROL FOR COLLISION AVOIDANCE IN A CONVEYOR SYSTEM

RELATED APPLICATIONS

This is a continuation application of the co-pending international application PCT/EP2008/006727 (WO 2009/024298 A1) filed on 15 Aug. 2008 which claims priority of the German patent application DE 10 2007 040 367.6 filed on 17 Aug. 2007, which is fully incorporated herewith by reference.

BACKGROUND OF THE INVENTION

The present invention relates to a conveyor system as well as a method for avoiding collisions between transport units, or conveyed goods, at intersection points of conveyor lines, for example, if they cross each other in the intersection point or converge to a single conveyor line.

Conveyor-line switches and crossings are known in the prior art, where the conveyed goods are stopped, if a collision with conveyed goods of another conveyor line is approaching. Typically, the stop of the conveyed goods is conducted by an abrupt deceleration. Then, the conveyed goods are accelerated again as soon as the other conveyed goods have passed the intersection point.

The document WO 97/09256 discloses a method and apparatus for injecting piece-good parts on a removal conveyor. The piece-good parts are transported to the removal conveyor by means of a delivery conveyor. The delivery conveyor includes at least one buffer belt, a request belt and an injection belt. The buffer belt, the request belt and the injection belt can be operated at different velocities. The removal belt is operated at a constant velocity. Thus, it is possible that piece-good parts are directed from the delivery conveyor to predetermined target locations on the removal conveyor.

The document DE 10 2004 035 821 discloses a method and an apparatus for dynamically optimizing gaps. The method serves to reduce and unify distances between piece goods which are conveyed, for example, on transportation belts. In this manner, the density can be optimized. Also, an increase of the utilization of the conveyor is possible.

The document EP 1 228 986 A1 also discloses a method and an apparatus for optimizing gaps on a conveyor belt.

The deceleration as well as the acceleration requires relatively much power, i.e. such systems do not work in a power-efficient manner. Further, a relatively high maintenance effort is required with such known systems, since the drives of the conveyor lines are heavily stressed by the steady deceleration and acceleration. Another disadvantage is to be seen in that the deceleration and acceleration are loud.

SUMMARY OF THE INVENTION

Therefore, it is an object of the present invention to provide a conveyor system as well as a method for conveying transport units being power efficient, free of maintenance and more quiet. Particularly, the throughput of transport units at an intersection point is to be increased, i.e. more transport units per unit of time should be allowed to pass the intersection point.

These objects are solved by a conveyor system comprising: at least first and second conveyor lines for conveying transport units, particularly containers, piece goods, cardboard boxes, etc., along a downstream direction, wherein the conveyor lines either cross in a common intersection point or merge in the intersection point to form a single line, wherein each of the conveyor lines respectively comprises a group of conveyor-line segments being located downstream with respect to the intersection point; at least one control device for adjusting variable conveying velocities for each conveyor line; at least one sensor device for detecting a traffic density of the transport units on the conveyor lines, particularly at conveyor-line segments of the groups being located most remotely in an upstream direction; wherein each conveyor-line segment is controllable by the control device such that it can be operated with a variable, particularly continuously adjustable, conveying velocity; wherein the control device is adapted to determine the traffic density, and which is further adapted to generate first control signals for adapting the conveying velocities of the conveyor-line segments to the one conveyor line so that a transport unit conveyed on the conveyor line is not colliding at the intersection point with transport units being conveyed on the other conveyor line, i.e. without stopping the transport units for this purpose.

These tasks are also solved by means of the innovative method for combining or crossing at least two conveyor lines on which transport units, particularly containers, are conveyed in a downstream direction, wherein the conveyor lines meet in an intersection point, wherein each of the conveyor lines respectively comprises a group of conveyor-line segments located upstream relative to the intersection point, wherein the conveyor-line segments can be operated respectively at variable conveying velocities, the method comprising the following steps: conveying transport units towards the intersection point; detecting and determining a traffic density of the transport units on the conveyor lines, particularly at conveyor-line segments being located most remotely upstream; determining conveying velocities dedicated to the conveyor-line segments such that transport units, which are conveyed on one of the conveyor lines, do not collide at the intersection point with transport units which are conveyed on the other conveyor line, i.e. without stopping the transport units in the region of the conveyor-line segments for this purpose; and adapting the conveying velocities of the conveyor-line segments to the conveying velocities being determined in this way.

The present invention is characterized by conveying in a "looking-ahead" manner, like in normal road traffic. This means that, for example, a control computer prematurely recognizes whether two or more transport units will meet each other at the crossing or the intersection point, particularly if they will collide with each other. Then, the control computer can counteract correspondingly by either decelerating or additionally accelerating one or more, particularly all, of the transport units. The velocity at which the transport units are conveyed will also be adapted to the respective situation (traffic density), namely such that none of the transport units is decelerated to the velocity of zero and such that no collisions will happen.

If a switch or crossing in accordance with the prior art would be compared to a crossing including lights, where the lights avoid a collision by signaling red light to one direction and signaling green light to the other direction, then the present invention could be compared well to a roundabout traffic. Before a transport unit enters the circle, the control computer gets an overview on the current situation (traffic density), namely at least in a region which is located in an (immediate) vicinity of the circle.

There are numerous possibilities to avoid a collision without a standstill of one of the transport units. All or some of the transport units can either be accelerated or decelerated while other transport units are transported at a constant velocity. The control computer can select the conveying velocity of a transport unit which moves towards the point of the crossing such that this transport unit is exactly arriving when a gap is present at the point of the crossing into which the transport unit can thus be guided.

The present invention is advantageous in that less power is required in comparison to a steady change between an entire standstill and a new acceleration. Further, a higher throughput as in comparison to conventional switches and crossings can be obtained where some of the transport units need to stand still in order to regulate the "traffic".

The conveyor system and the method in accordance with the present invention also are more quiet than known devices or methods.

Another advantage is to be seen in that the participating components, such as drives, brakes, etc., are wearing out less as compared to an abrupt standstill followed again by an acceleration.

In accordance with a preferred embodiment the control device is further adapted to generate control signals for also adapting the conveying velocity of the conveyor-line segments of the first conveyor line, so that the transport units do not need to be stopped upstream to the intersection point, or collide with each other there.

With other words, both the velocity of the transport units in the circle and the velocity of such transport units which are to be inserted into the circle can be varied without standstills.

Additionally, it is advantageous if the control device is adapted to recognize associated transport units as a group, and to handle a group like a single transport unit.

More and more it happens that a number of transport units is grouped to form a group ("slug") which preferably is not to be separated. Thus, for example, all articles which are required for processing a picking order can be lined-up one behind the other and can be transported as a group through the conveyor system. Typically, the distances between associated transport units are so small (for example 5 cm) that, although distances between the transport units are present, it is advantageous if this group is not resolved. In such a case, the group in its entirety is either decelerated or accelerated.

Further, it is preferred if the control device is adapted to generate second control signals so that transport units of a group are separated.

It can always be possible that a number of transport units is densely accumulated one behind the other and is transported through the conveyor system similar to a group. Here, it can be desirable to generate a gap in this group-like arrangement of transport units in order to inject one or more transport units.

Also, it is advantageous if the sensor device is a camera which generates an image of the conveyor lines upstream relative to the intersection point. Alternatively, the sensor device can be one or more light barriers, or pressure sensors.

The sensor unit monitors when a transport unit reaches the control-relevant region in front of, i.e. upstream relative to, the intersection point where the transport or conveying velocity can be adapted correspondingly in order to avoid a collision.

In accordance with another preferred embodiment the sensor device is arranged apart, upstream relative to the intersection point, so that the control device can calculate the control signals which are required for the avoidance of collisions in real time.

The present invention is characterized by a high flexibility. The present invention can react on "traffic situations" in real time. Hence, the present case does not deal with a control procedure which can be planned well in advance over a longer period of time (hours, days, etc.). In highly dynamical systems, for which the present invention is intended, the requirements on the control of the conveyor system can vary within seconds. The material flow in a conveyor system, particularly in an order-picking system, is highly dynamical. Therefore, a (subordinated) control should be equipped with at least a certain intelligence for foreseeing problems and simultaneously providing solutions to the problems.

In accordance with another particular embodiment a subordinated control device is provided at each of the conveyor-line segments, the subordinated control device in turn being coupled to the control device and, for example, regulates the drive of the conveyor-line segment.

Here, the principle of a decentralized control logic is realized. The subordinated control is relieved, and thus has greater remaining capacities.

Additionally, it has shown particularly advantageous if the sensor unit is adapted to supply signals to the control device which are suitable for determining a transporting velocity of each of the transport units.

Typically, it is assumed that the control device has knowledge of the transporting velocities being present in the system by having knowledge of the conveying velocities of the individual conveyor-line segments. Nevertheless, it might be desirable to check these "theoretical" velocities in practice. Therefore, sensor units can be used by which not only the location of a transport unit but also the velocity thereof can be determined.

With a particularly advantageous embodiment of the present method, the conveyor lines are operated, under normal conditions, at a constant average conveying velocity, wherein the conveying velocities of the conveyor-line segments, if a collision is approaching, can be, particularly continuously, increased and/or decreased in comparison to the constant average conveying velocity.

Further, it is advantageous if conveyor-line segments which are arbitrarily following each other, can be operated at different conveying velocities.

This allows an accumulation or separation of transport units on one and the same conveyor line, particularly at the same time.

Further, it is preferred if the conveying velocities are adapted such that at least one gap is generated in a group of a number of transport units directly following each other.

It is clear that the above-mentioned and hereinafter still to be explained features cannot only be used in the respectively given combination but also in other combinations or alone without departing from the scope of the present invention.

BRIEF DESCRIPTION OF THE DRAWINGS

Embodiments of the invention are illustrated in the drawings and will be explained in more detail in the following description, wherein.

PREFERRED EMBODIMENTS OF THE INVENTION

Figure 1:
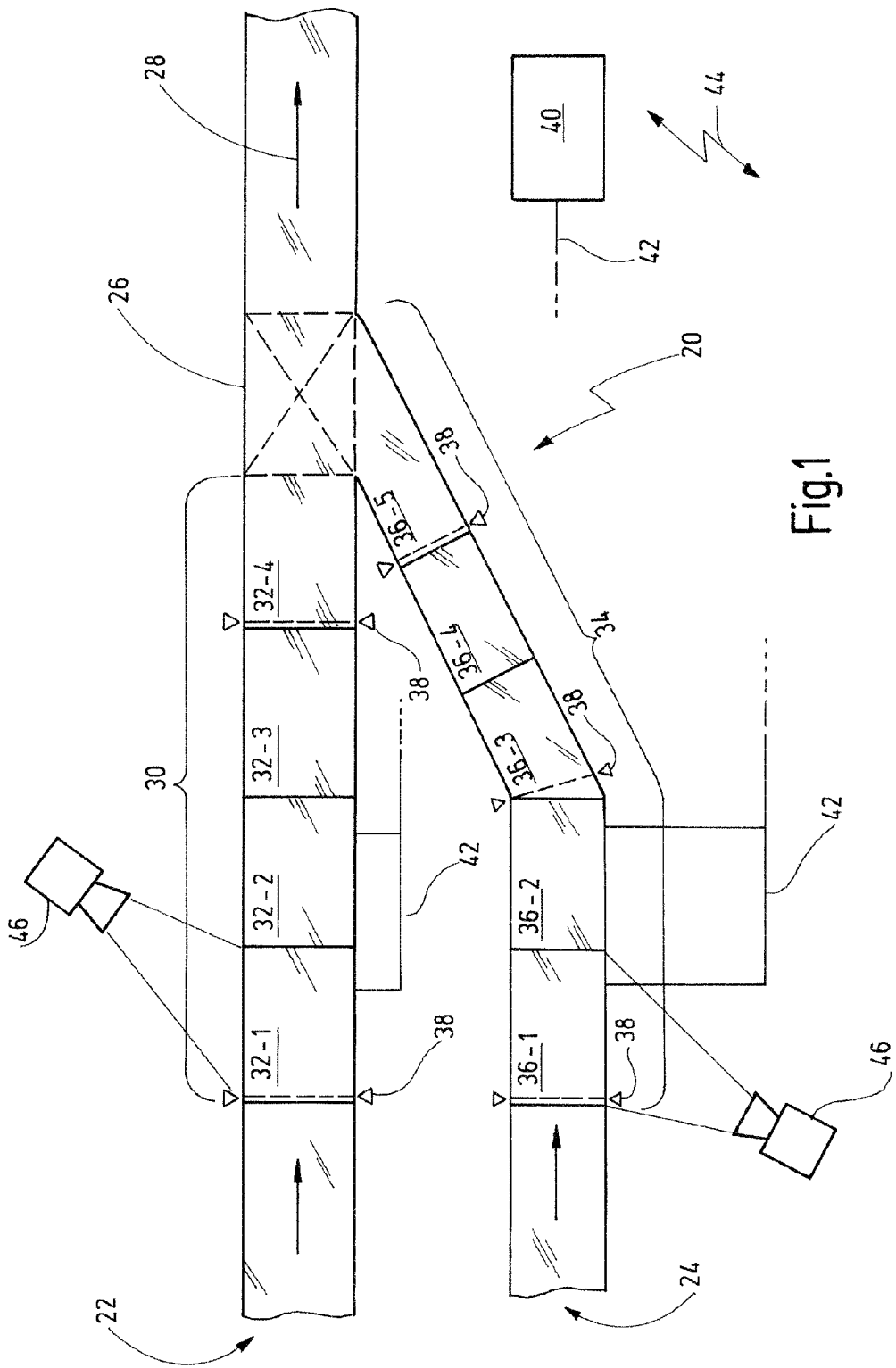
FIG. 1 shows a top view of a conveyor system in accordance with the present invention.

In the following description of the drawings identical elements will be designated by the same reference numerals. If features are formed differently in comparison to a preceding explanation, this will be explicitly explained.

The present invention relates to an order-picking system 20 as exemplarily depicted in a top view of FIG. 1.

The present invention particularly can be used with order-picking warehouses. In order-picking warehouses goods, articles, piece goods etc. are often loaded on load supports (trays, pallets, containers, etc.) for allowing conveyance and transportation in the order-picking system. However, the articles can also be transported without load supports. In the following, a transport unit is to be understood either as a combination of an article or goods and a load support, or as an article without a load support. Typically, packing units are handled in terms of articles. For example, one layer of twelve milk bags can be regarded as one article. Similarly, batches of pharmaceuticals, which can include a number of individual packages, can be regarded as one article. Preferably, containers are used for transporting the packing units, particularly containers having constant dimensions. The combination of a container and the articles included therein is also an example for a transport unit.

The conveyor system of the present invention is used, for example, for retrieving transport units from a warehouse and conveying the same to an order-picking station, a sorting system, a shipping station, or similar.

Conveyor systems typically comprise a plurality of conveyor lines. There are different types of conveyors. For example, chain conveyors, roller conveyors, belt conveyors, hanging conveyors, etc. are known. The implementation of the invention is independent of the type used. In the following, the invention exemplarily will be explained by means of a belt-conveyor system.

A section of a conveyor system 20 is shown in FIG. 1. The section of FIG. 1 shows a top view of two belt-conveyor lines 22 and 24 which meet each other in an intersection point 26. The intersection point 26 is illustrated by a rectangular being surrounded by a dashed line and having a cross of dashed lines in the middle. Transport units (not depicted here) are transported downstream, i.e. in FIG. 1 from the left to the right, along a conveying direction 28 which is indicated by means of dark arrows.

Upstream relative to the intersection point 26, i.e. to the left of the intersection point 26 in FIG. 1, the first conveyor line 22 comprises a group 30 of conveyor-line segments 32. Four conveyor-line segments 32-1 through 32-4 are depicted here which can be controlled individually, i.e. they can be operated independently from each other. Belt-conveyor segments are known in the prior art. The second conveyor line 24 comprises, upstream relative to the intersection point 26, five conveyor-line segments 36-1 through 36-5 in terms of a group 34. In the following, these groups 30 and 34 will be designated as pre-zones.

In conventional order-picking systems, conveyor-line segments are typically operated at average velocities of 1.0 to 1.2 m/s. The conveyor-line segments of the present invention can be operated at velocities of up to 2 m/s. The slowest velocity in this instance is 0.1 m/s. With the present invention the conveying velocity of the conveyor-line elements can be varied continuously between these two extreme values. However, the change typically happens discretely, i.e. in terms of steps having a size of 0.1 m/s. With the present invention preferably one of the conveyor lines is operated at the maximum velocity, while the other conveyor line is adapted so that no collisions between conveyed goods occur.

It is clear that the number of conveyor-line segments can be varied arbitrarily in each group. The number of the conveyor-line segments in the individual groups does not need to be equal. Also, conveyor-line segments of different types can be used in the respective lines. Thus, the first conveyor line 22, for example, can consist of belt conveyors, whereas the second conveyor line 24 consists of roller conveyors. Besides that it is clear that the conveyors do not necessarily need to be orientated linearly. Also, conveyors having a curvature (such as curve elements) can be used.

At the upstream located conveyor-line segment 32-1 or 36-1 preferably one sensor unit 38, such as a light barrier, is provided at the upstream end thereof. The position of the light barrier can vary relative to the conveyor-line segment 32 or 36. It is clear that also other sensor types, such as pressure sensors in rollers of a belt conveyor or roller conveyor, can be used for detecting the time when a transport unit (not shown) enters a zone (i.e. a segment) upstream to the intersection point 26, where the conveying velocity of the transport unit can be adapted to the respective situation. The transport unit is typically known at this location.

In the present case of FIG. 1, the groups 30 and 34 of conveyor-line segments represent these pre-zones upstream to the intersection point 26. The length of each pre-zone can be chosen arbitrarily. At least, they should be sufficiently long, i.e. comprise sufficiently many conveyor-line segments, for allowing a flexible reaction on a plurality of different traffic densities.

If the term "traffic density" is used hereinafter, it referred to the transport units which are currently located in the conveyor system 20, particularly in the region of the intersection point 26, wherein ideally one knows the location and velocity at a pre-given time as exactly as possible. The sensor units 38 are at least adapted for determining the locations. Alternatively, they can be used for the velocity determination. The traffic density includes information on: the number of transport units approaching the intersection point 26, the velocity they have, and where they are currently located. With the aid of the traffic density, collisions can be predicted at the intersection point 26.

The data determined by the sensors 38 (particularly the location, time, and/or velocity) are transmitted through a line 42 to a control 40 for the purpose of further processing. The control determines the traffic density from the data of the sensors 38. Particularly, the line 42 is a bus system. The data transmission alternatively happens wirelessly, as indicated by a double arrow 44 in FIG. 1.

Alternatively or additionally to the light barriers 38, one or more cameras 46 can be employed. In this case, the control 40 is provided with corresponding image-processing capabilities for allowing extraction of the required data from the images of the camera(s) 46.

It is clear that beside the previously explained sensors 38 and 46, located at the end located upstream of the pre-zones, also other sensors can be arranged along the course of the conveyor lines 22 and 24. These sensors can be located further upstream or downstream. With the aid of these sensors, one can once again verify, particularly shortly upstream to the intersection point 26, whether the velocity adaptations, initiated by the control device 40, actually have been converted. Sensors upstream to the pre-zones allow a more complete overview with respect to the traffic density. The control can recognize collisions even earlier, and then initiate corresponding countermeasures in the area of the pre-zones 30 and 34, in order to avert the approaching collision. It is clear that the number of the sensors 38 is to be kept small, if possible, in order to keep the investment costs and maintenance work associated with additional sensors as small as possible.

With reference to the FIGS. 2A through 2D hereinafter a flow control for avoiding collisions in accordance with the present invention will be explained.

Figure 2A:
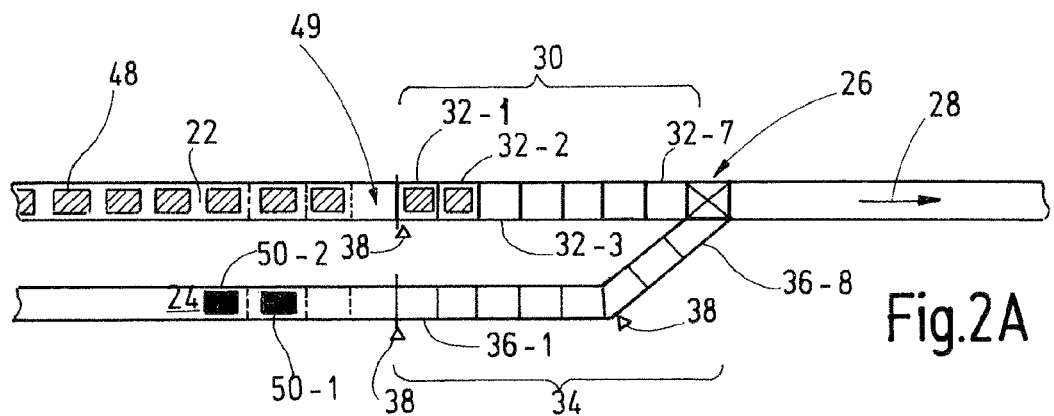
FIG. 2A-2D shows a sequence reflecting the method of the present invention.

In FIG. 2A, a start situation is depicted where at least two transport units 48, which are illustrated in a shaded manner, on the first conveyor line 22 have entered the pre-zone 30 upstream to the intersection point 26. These two transport units 48 are located on the conveyor-line segments 32-1 and 32-2 in FIG. 2A.

Two other transport units 50-1 and 50-2, which are illustrated in black, are located on the second conveyor line 24. However, these transport units 50-1 and 50-2 have not yet entered the pre-zone 34. A collision is not in sight since the transport units are "out of sight" for the sensors 38 at the second conveyor line 24.

The control 40 (cf. FIG. 1) thus knows for sure that two transport units 48 are present in the pre-zone 30, whereas any transport unit is present in the pre-zone 34. This situation describes one of a plurality of possible (situation-dependent) traffic densities (in the pre-zones 30 and 34), which is not critical with regard to a possible collision. It is to be noted that the transporting velocities typically take an average constant value, such as 1.5 m/s, for all of the conveyor lines 22-24.

Figure 2B:
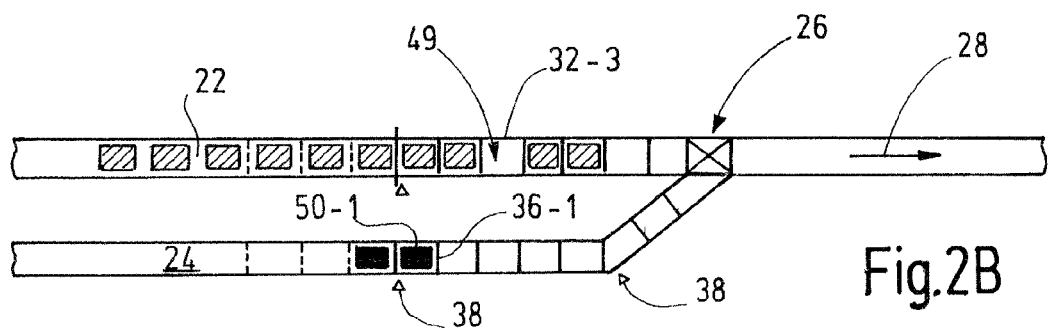

FIG. 2B shows the conveyor system of FIG. 2A at a later point in time.

In the meantime, four transport units 48 are located in the pre-zone 30 and the one transport unit 50-1 is located in the pre-zone 34, namely on the conveyor-line segment 36-1. Between the four transport units in the zone 30 one empty space, or a gap 49 (cf. FIG. 2A), is present into which the transport unit 50-1 could be inserted at the intersection point 26.

It is to be noted that the control device 40 does not need to have knowledge of the traffic density upstream relative to the downstream located ends of the pre-zones 30 and 34 in order to conduct the desired action (insertion of the transport unit 50-1). The control device 40 is provided with a corresponding "intelligence", i.e. controlling software, which is adapted to coordinate the insertion.

Assuming that both of the conveyor lines 22 and 24 are operated at the same average velocity, then the gap 49, or the free space, on the conveyor-line segment 32-3 is only five spaces (including the intersection point 26) apart from the intersection point 26. The transport unit 50-1 in turn is still eight conveyor-line segment lengths apart from the intersection point 26. The lengths of the conveyor-line segments here exemplarily are all equal. Of course, in reality they can also be different. The lengths are known to the control device so that they can be considered upon a velocity adaptation.

With respect to the concrete example of FIG. 2B this means that the transport unit 50-1 needs to be transported faster in order to cover a longer way within the same time in comparison to the gap 49 on the first conveyor line 22.

Figure 2C:
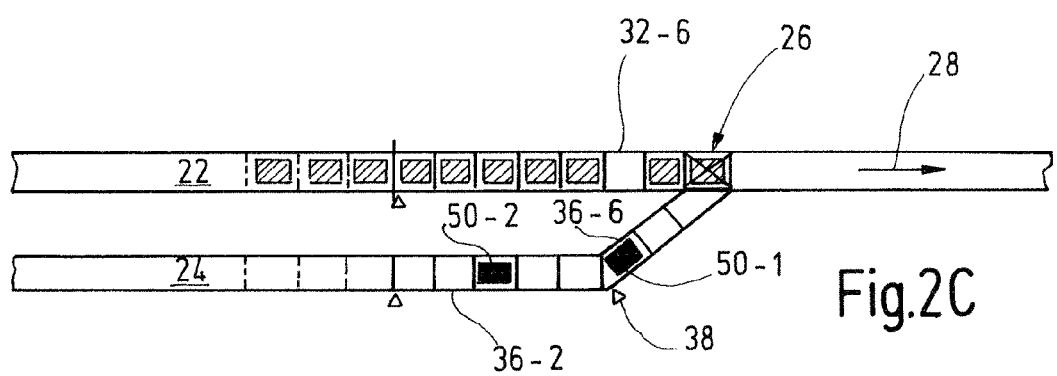

In the situation of FIG. 2C the control device 40 globally has not changed the velocity of the first conveyor line 22. The gap 49 has advanced about three spaces on the conveyor-line segment 32-6. In the same time, the transport unit 50-1 has moved about five spaces downstream to the conveyor-line segment 36-6 by means of a velocity increase of the corresponding conveyor-line segments 36. This can be verified by another optional light barrier 38.

Further, the second transport unit 50-2 on the second conveyor line 24 has entered the pre-zone 34. However, the control 40 simultaneously recognizes that there is no additional free space on the first conveyor line 22 for the transport unit 50-2, at least not within the pre-zone 30. Therefore, the control device decides that the transporting velocity of the transport unit 50-2 is to be kept unchanged for the time being, or is even decreased. This is also the reason why the transport unit 50-2 only moves about three spaces downstream in comparison to FIG. 2B, while the unit 50-1 has moved about five spaces.

Figure 2D:
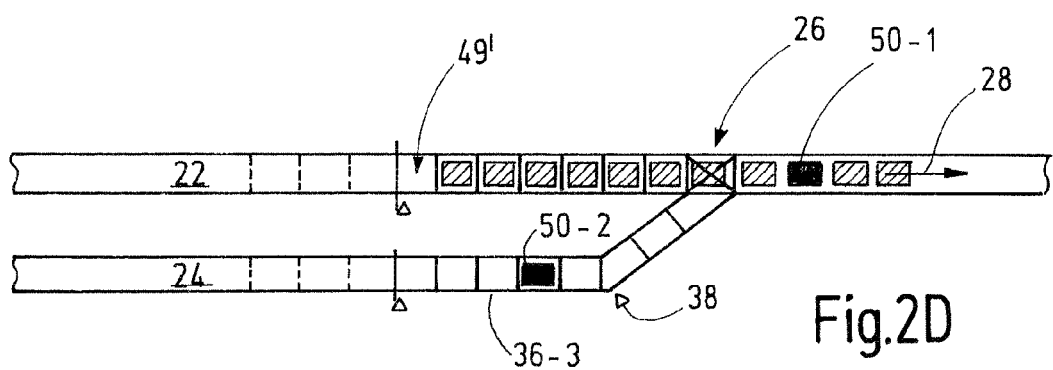

FIG. 2D shows the situation where the transport unit 50-1 has been inserted into the gap 49 and already passed the intersection point 26 about two spaces. Although the transport units on the first conveyor line 22 still move at the typical average velocity, the transport unit 50-2 only has moved about one space in comparison to the situation of FIG. 2C, because it was moved in a decelerated manner in order to wait for another gap. However, the control device 40 is now provided with the information that the first conveyor-line segment 32-1 of the pre-zone 30 has a new empty space 49' to which the transport unit 50-2 of the second conveyor line 24 can be conveyed.

The process, which has just been described with respect to the transport unit 50-1, is repeated for the unit 50-2, however, under different circumstances. While the first conveyor line 22 is still operated at the average conveying velocity, the second conveyor line 24 or the conveyor-line segments 36 of the pre-zone 34 of the second conveyor line 24 are operated in a decelerated manner.

With reference to FIG. 3A once again a conveyor system similar to the one of FIG. 2 is shown, but at another exemplary situation. The first conveyor line 22 further comprises another sensor 38' at an arbitrary location upstream the pre-zone 30, thus the control device 40 is informed on the traffic density of at least the first conveyor line 22 as early as possible.

Figure 3A:
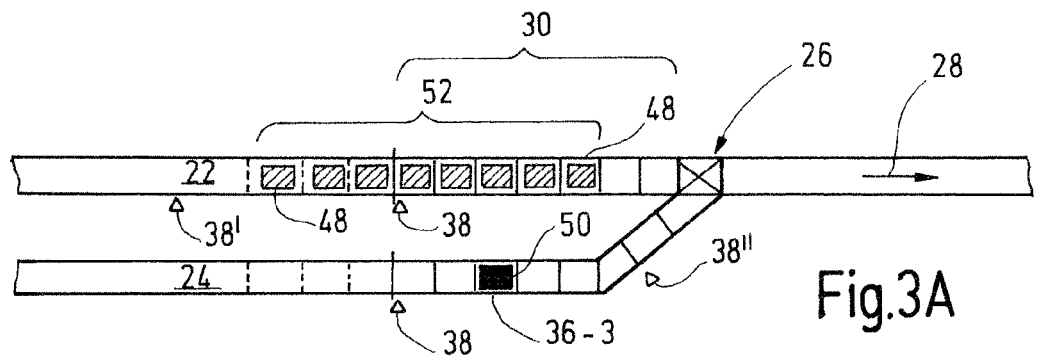
FIG. 3A-3C shows an alternative embodiment of the method in accordance with the present invention.

In the example of FIG. 3A eight transport units 48 directly following each other form a so-called group 52 of transport units 48. Within the group 52 there is no gap into which the transport unit 50, which is located on the second conveyor line 24, could be inserted. Thus, there are two possibilities for avoiding a collision. The transport unit 50 is either injected in the front of the group 52 or after the group 52, or the group 52 is divided for generating the required gap 49.

Figure 3B:
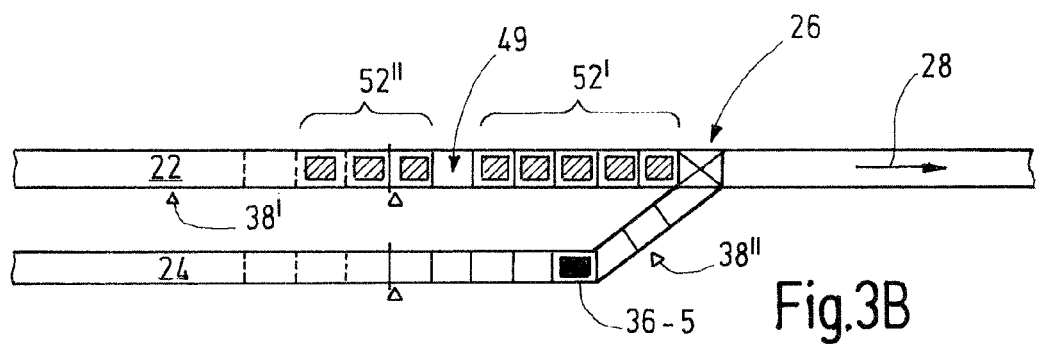
Figure 3C:
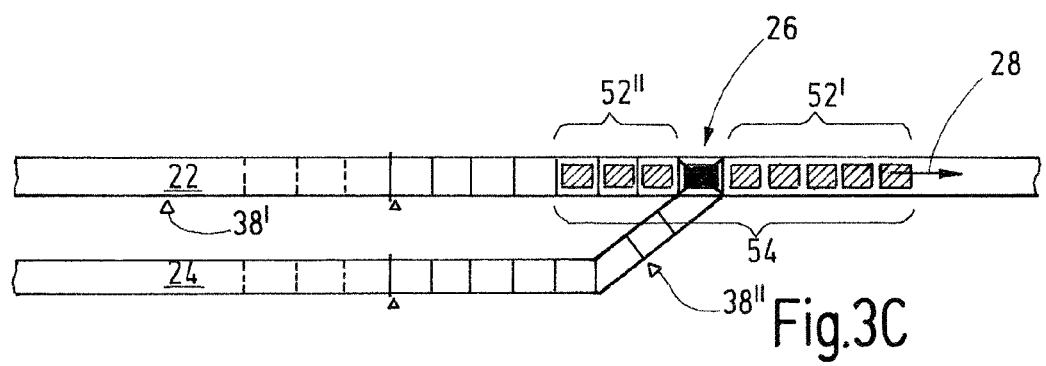

FIGS. 3B and 3C show the last possibility. The group 52 is separated into a first partial group 52' and a second partial group 52" by short-timely accelerating the transport units 48 of the first partial group 52' collectively. Hence, a certain distance, i.e. the gap 49, is generated relative to the remaining transport units 48 of the second partial group 52".

FIG. 3C shows the situation where the transport unit 50 is inserted into the gap 49 generated in FIG. 3B.

Figure 3D:
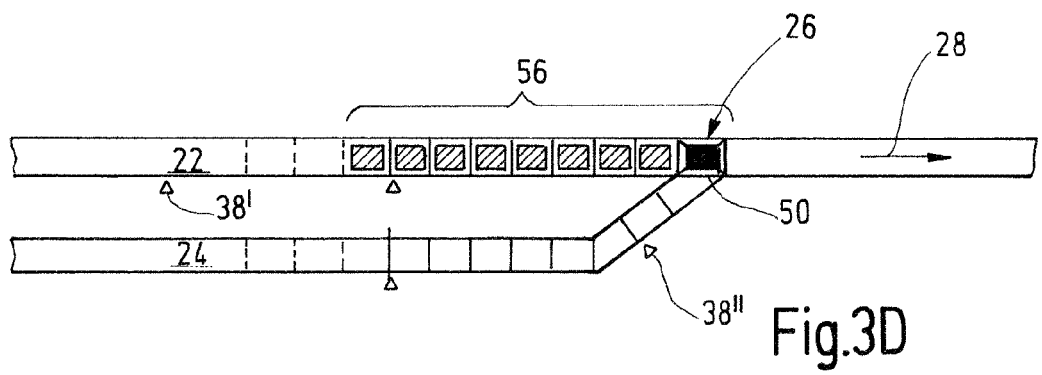
FIG. 3D shows another alternative of the method of the invention.

With reference to FIG. 3D the situation is shown where the transport unit 50 is pulled in the front of the group 52. Here, the transport unit 50 is exemplarily pulled directly in the front of the group 52 of FIG. 3A, in order to form a new group 56.

It is clear that also the collection of the transport units of FIG. 3C could have formed a new group.

FIGS. 3A through 3D clearly show that the present invention may also be used as a sorting device, since "new" transport units can be inserted at arbitrarily selectable positions (space) within an existing sequence, particularly at a predetermined space.

Figure 4A:
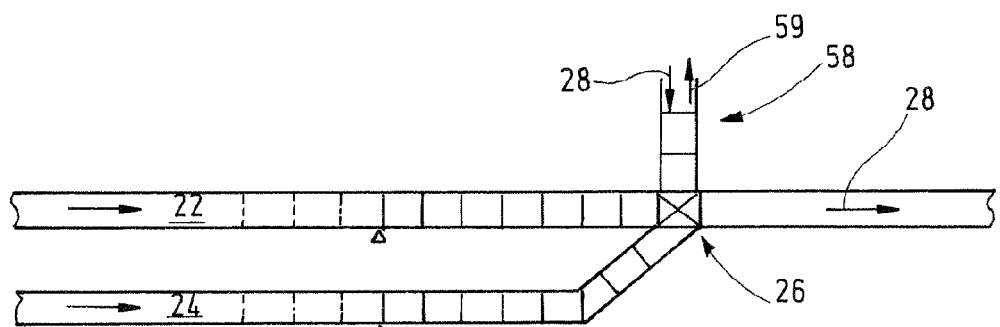
FIG. 4A-4D show a number of different embodiments of a conveyor system of the present invention.

With reference to FIG. 4A another embodiment of a conveyor system of the invention is shown.

The system of FIG. 4A is similarly constructed to the system of FIG. 2A, wherein a third conveyor line 58 is additionally provided. If the conveyor line 58 is operated in the main conveying direction 28, i.e. in a downstream direction, then three conveyor lines meet in the intersection point 26.

If the third conveyor line 58 in turn is operated in an opposite direction, as it is indicated by an arrow 59, the intersection point 26 represents a crossing of the second and third conveyor lines 24 and 58 together with the first conveyor line 22. The transport units of the second conveyor line 24 are then conveyed on the third conveyor line 58.

Figure 4B:
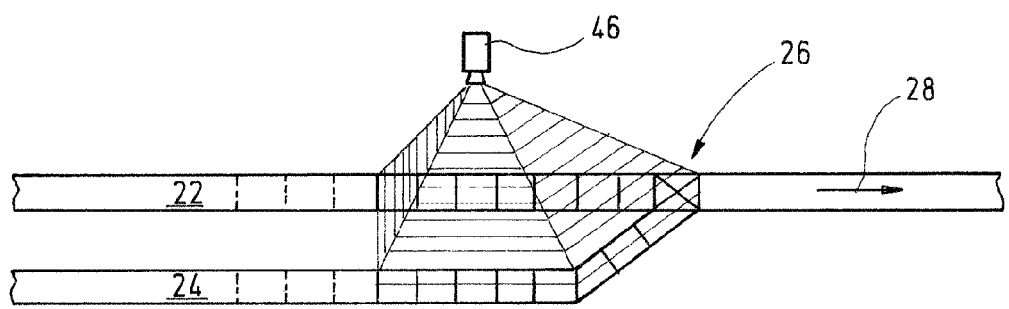

In FIG. 4B another embodiment of the conveyor system of FIG. 2A is shown. The system of FIG. 4B is formed identically to the system of FIG. 2A except that a single camera 46 is employed instead of the light barrier 38, the camera 46 detecting the traffic density at least within the pre-zones 30 and 34 as well as at the intersection point 26.

Figure 4C:
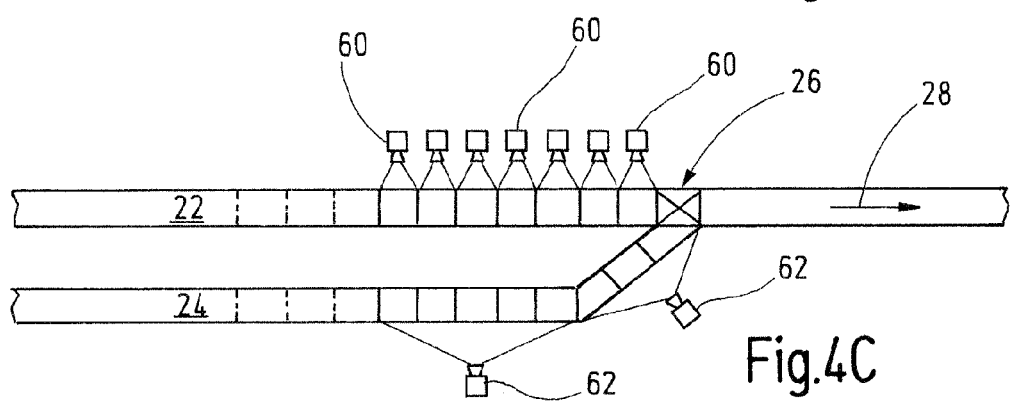

Another modification of the system of the invention is shown in FIG. 4C. The system is constructed identically to the system of FIG. 4B, wherein the individual camera 46 has been replaced by a plurality of cameras 60 and 62. With the first conveyor line 22 one camera 64 is employed for each conveyor-line segment, particularly within the pre-zone 30. In the region of the second conveyor line 24, a first camera 62 is employed for the first straight partial piece of the pre-zone 34, and another camera 62 is employed for the second straight partial piece, which represents the transition to the first conveyor line 22. The cameras 62 also monitor sections of the pre-zone 34.

It is clear that alternative individual cameras 60 could be used with the second conveyor line 24, similar to the region of the first conveyor line 22. On the other hand, section cameras 62 could also be employed at the first conveyor line 22.

Figure 4D:
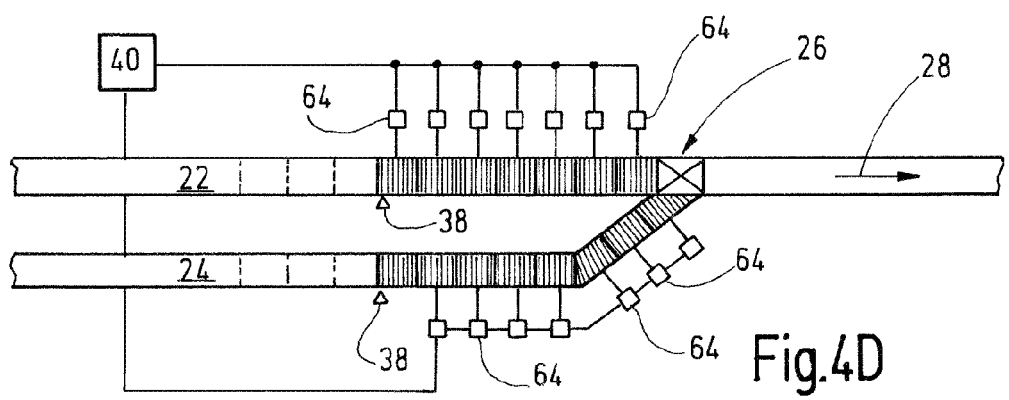

FIG. 4D shows another modification of the conveyor system of FIG. 2A of the present invention.

Roller conveyors, instead of belt conveyors, are employed in the pre-zones 30 and 34. Each conveyor-line segment is provided with its own controller 64 controlling the drive. The controllers 64 represent subordinated control devices. The controllers 64 are respectively coupled to the control device 40. The controllers 64 of the first conveyor line 22 are coupled in parallel to the control device 40. The controllers 64 of the second conveyor line 24 are coupled to the subordinated control computer 40 in accordance with a so-called "daisy-chain" catenation.

Figure 5:
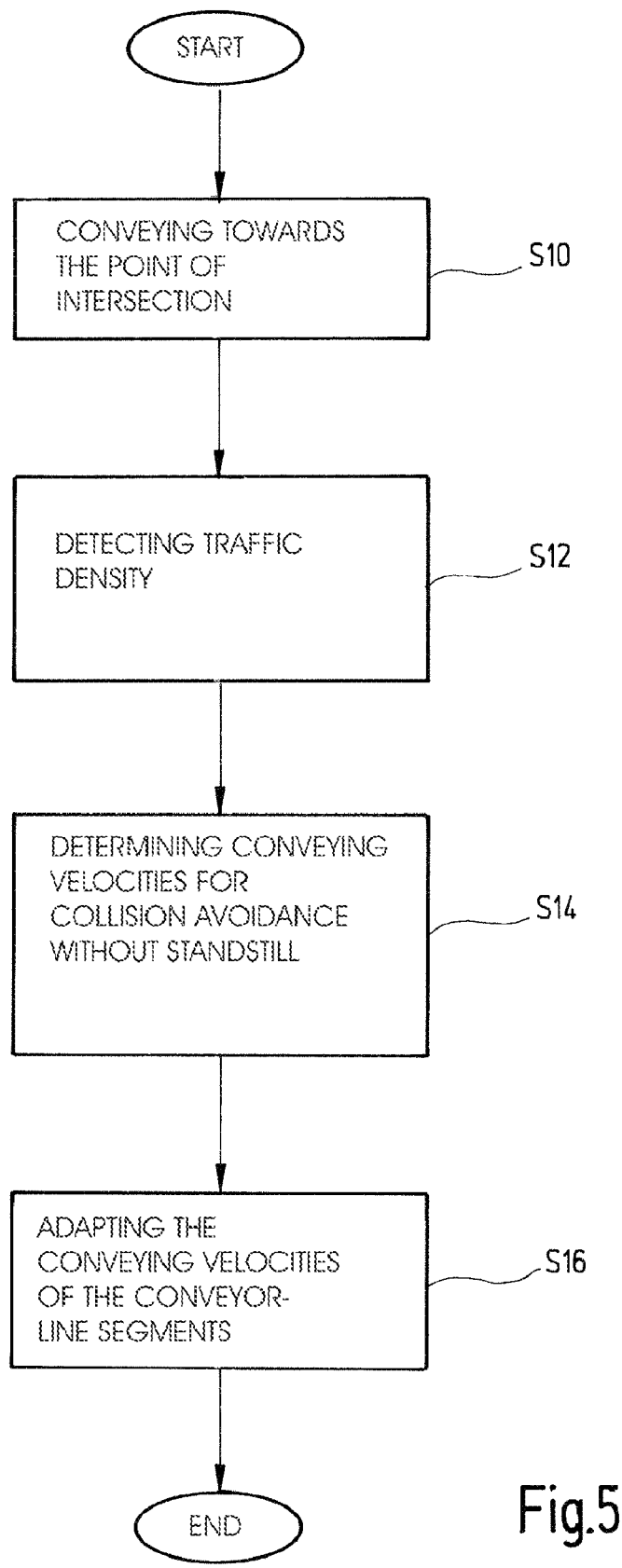
FIG. 5 shows a flow chart of the method in accordance with the present invention.

With reference to FIG. 5 the method for avoiding a collision in accordance with the present invention is illustrated in a heavily schematized matter.

In a first step S10 transport units 48 and 50 are transported towards the intersection point 26. In another step S12 the traffic density of the transport units on the conveyor lines, particularly at the conveyor segments being located most remotely upstream, are detected. In a step S14 conveying velocities for collision avoidance without standstill are determined. And in a step S16 the conveying velocities of the conveyor-line segments are adapted.

I claim:

1. A conveyor system comprising:
   at least first and second conveyor lines for conveying transport units without a stop at an intersection point in a downstream direction, wherein the at least first and second conveyor lines either cross each other at the intersection point, or merge to one single line at the intersection point, wherein each of the at least first and second conveyor lines comprises, upstream relative to the intersection point, respectively one group of adjacently arranged conveyor-line segments;
   at least one control device for adjusting variable conveying velocities at each of the at least first and second conveyor lines; and
   at least one sensor device for detecting a traffic density of the transport units on the at least first and second conveyor lines;
   wherein each of the conveyor-line segments is controllable by the at least one control device such that it can be operated at a variable conveying velocity;
   wherein the control device is adapted to determine the traffic density, and is further adapted to generate first control signals based on the determined traffic density for adapting the conveying velocities of the conveyor-line segments of one of the at least first and second conveyor lines such that a transport unit which is conveyed on the one of the at least first and second conveyor lines does not collide at the intersection point with other transport units, which are conveyed on one of the other of the at least first and second conveyor lines,
   wherein arbitrarily each of the conveyor-line segments is operable at a different conveying velocity, and wherein a respective velocity at which each of the transport units is conveyed on the at least first and second conveyor lines is never decelerated to zero.

2. The conveyor system of claim 1, wherein the transport units are containers.

3. The conveyor system of claim 1, where the traffic density is detected at conveyor-line segments of the groups being located mostly apart upstream.

4. The conveyor system of claim 1, wherein the conveyor-line segments are controllable such that they are operated at the variable conveying velocity which is continuously changeable.

5. The conveyor system of claim 1, wherein the control device is further adapted to generate control signals for also adapting the conveying velocities of the conveyor-line segments of the one of the other conveyor lines so that the transport units do not need to be stopped at the intersection point, or collide with each other.

6. The conveyor system of claim 1, wherein the control device is adapted to recognize associated transport units as a group, and to handle the group like one single transport unit.

7. The conveyor system of claim 6, wherein the control device is adapted to generate second control signals so that transport units of the group are separated.

8. The conveyor system of claim 1, wherein the sensor device is a camera generating an image of the conveyor lines located upstream relative to the intersection point.

9. The conveyor system of claim 1, wherein the sensor unit is a light barrier.

10. The conveyor system of claim 1, wherein the sensor unit is a pressure sensor.

11. The conveyor system of claim 9, wherein the sensor unit is arranged upstream apart relative to the intersection point such that the control device can calculate the control signals in real time, which are required for the collision avoidance.

12. The conveyor system of claim 1, wherein, at each of the conveyor-line segments, a subordinated control device is provided which in turn is coupled to the control device, and which controls a drive of one of the conveyor-line segments.

13. The conveyor system claim 1, wherein the sensor unit is adapted to supply signals for determining a transporting velocity of each of the transport units.

14. A conveyor system comprising:
   at least first and second conveyor lines for conveying transport units without a stop at an intersection point in a downstream direction, wherein the at least first and second conveyor lines either cross each other at the intersection point, or merge to one single line at the intersection point, wherein each of the at least first and second conveyor lines comprises, upstream relative to the intersection point, respectively one group of adjacently arranged conveyor-line segments;

at least one control device for adjusting variable conveying velocities at each of the at least first and second conveyor lines; and at least one sensor device for detecting a traffic density of the transport units on the at least first and second conveyor lines;

wherein each of the conveyor-line segments is controllable by the at least one control device such that it can be operated at a variable conveying velocity;

wherein the control device is adapted to determine the traffic density at conveyor-line segments furthest upstream from the intersection point, and is further adapted to generate first control signals based on the determined traffic density for adapting the conveying velocities of the conveyor-line segments of one of the at least first and second conveyor lines such that a transport unit which is conveyed on the one of the at least first and second conveyor lines does not collide at the intersection point with other transport units, which are conveyed on one of the other of the at least first and second conveyor lines, wherein arbitrarily each of the conveyor-line segments is operable at a different conveying velocity, and wherein a respective velocity at which each of the transport units is conveyed on the at least first and second conveyor lines is never decelerated to zero.

* * * * *